(12) United States Patent
Ito et al.

(10) Patent No.: US 9,517,722 B2
(45) Date of Patent: Dec. 13, 2016

(54) VEHICLE INTERIOR ILLUMINATION DEVICE

(71) Applicant: Nissan Motor Co., Ltd., Yokohama-shi, Kanagawa (JP)

(72) Inventors: Mitsuhito Ito, Chigasaki (JP); Tooru Furukawa, Sagamihara (JP); Masahiro Utsugi, Atsugi (JP); Ryuji Kondou, Yokohama (JP); Kiyoshi Ochiai, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 14/442,750

(22) PCT Filed: Nov. 22, 2013

(86) PCT No.: PCT/JP2013/081549
§ 371 (c)(1),
(2) Date: May 14, 2015

(87) PCT Pub. No.: WO2014/091906
PCT Pub. Date: Jun. 19, 2014

(65) Prior Publication Data
US 2015/0298606 A1    Oct. 22, 2015

(30) Foreign Application Priority Data

Dec. 13, 2012    (JP) ................. 2012-272283

(51) Int. Cl.
*B60Q 1/02*    (2006.01)
*B60Q 3/02*    (2006.01)
(Continued)

(52) U.S. Cl.
CPC .............. *B60Q 3/0293* (2013.01); *B60Q 1/14*
(2013.01); *B60Q 1/26* (2013.01); *B60Q 3/0216* (2013.01); *B60Q 3/0279* (2013.01); *H05B 33/08* (2013.01)

(58) Field of Classification Search
CPC .............. H05B 33/08; B60Q 1/14; B60Q 1/26
(Continued)

(56) References Cited

U.S. PATENT DOCUMENTS 5,151,850 A    9/1992 Matsuno et al.
5,226,711 A    7/1993 Matsuno et al.
(Continued)

FOREIGN PATENT DOCUMENTS

FR    2880313 A1    7/2006
JP    3-28035 A    2/1991
(Continued)

*Primary Examiner* — Tung X Le
(74) *Attorney, Agent, or Firm* — Global IP Counselors, LLP

(57) ABSTRACT

A vehicle interior device includes a first illumination unit configured to illuminate a first region of a passenger compartment of a vehicle, a second illumination unit configured to illuminate a second region in a rear part of the vehicle more rearward than the first region and being disposed in the upper part of the passenger compartment, a third illumination unit configured to illuminate a third region in a low part of the vehicle lower than the first region and being disposed in the front part of the passenger compartment, a fourth illumination unit configured to illuminate a fourth region in the rear part and in the low part, and a controller programmed to differentiate at least one of an intensity of the first illumination unit relative to the fourth illumination unit and an intensity of the second illumination unit relative to the third illumination intensity unit.

16 Claims, 8 Drawing Sheets

(51) Int. Cl.
*B60Q 1/26* (2006.01)
*H05B 33/08* (2006.01)
*B60Q 1/14* (2006.01)

(58) Field of Classification Search
USPC .................................................. 315/77, 82
See application file for complete search history.

(56) References Cited

U.S. PATENT DOCUMENTS

| | | | |
|---|---|---|---|
| 6,179,453 B1 | 1/2001 | McMahon | |
| 6,414,437 B1* | 7/2002 | Diez | B60Q 1/1407 307/10.8 |
| 2002/0029103 A1* | 3/2002 | Breed | B60N 2/002 701/45 |
| 2009/0021955 A1* | 1/2009 | Kuang | B60Q 3/0259 362/479 |
| 2012/0235568 A1 | 9/2012 | Prodin et al. | |

FOREIGN PATENT DOCUMENTS

| | | |
|---|---|---|
| JP | 4-129856 A | 4/1992 |
| JP | 2001-97113 A | 4/2001 |
| JP | 2010-63188 A | 3/2010 |
| JP | 2010-509131 A | 3/2010 |
| JP | 2010-241274 A | 10/2010 |
| WO | 2009/089109 A1 | 7/2009 |

* cited by examiner

| ILLUMINATION UNIT | | INTENSITY |
|---|---|---|
| 1ST UNIT | HANDLE ILLUMINATION | 5TH INTENSITY |
| | 1ST CENTRAL ILLUMINATION | 5TH INTENSITY |
| | FRONT ILLUMINATION | 4TH INTENSITY |
| 2ND UNIT | UPPER ILLUMINATION | 6TH INTENSITY |
| | 2ND CENTRAL ILLUMINATION | 5TH INTENSITY |
| 3RD UNIT | POCKET ILLUMINATION | 3RD INTENSITY |
| | FOOT ILLUMINATION | 4TH INTENSITY |
| 4TH UNIT | | 3RD INTENSITY |

FIG. 6

VEHICLE INTERIOR ILLUMINATION DEVICE

CROSS-REFERENCE TO RELATED APPLICATIONS

This application is a U.S. National stage application of International Application No. PCT/JP2013/081549, filed Nov. 22, 2013, which claims priority to JP Patent Application No. 2012-272283 filed on Dec. 13, 2012, the contents of each of which are hereby incorporated herein by reference.

BACKGROUND

Field of the Invention

The present invention relates to a vehicle interior illumination device disposed in an interior space or passenger compartment a vehicle to illuminate the vehicle interior or passenger the passenger compartment.

Background Information

Conventionally, a vehicle interior illumination device is known in which a vehicle interior light disposed within a cabin or passenger compartment is controlled in accordance with a vehicle speed (see Japanese Patent Application Publication No. 2010-63188 A, for example).

SUMMARY

However, in the conventional vehicle interior illumination device, although the illumination intensity is changed depending on the vehicle speed, the degree of the change is uniform. That is, for example, regardless of whether the vehicle interior light is disposed in a position which is difficult to be viewed in the footwell near the driver, or in another, higher position which is easily viewed by the driver, the intensity is uniform and the same between the two interior lights. Thus, no consideration is given to the degree of change.

Therefore, a problem occurs in which the driver may be hassled or annoyed because the lighting is too bright, or the vehicle interior is too dark as a whole and not properly illuminated.

The present invention has been made in view of the above problems, and aims to provide a vehicle interior illumination device which can illuminate a vehicle interior or passenger compartment appropriately while preventing the driver from feeling nuisance.

In order to achieve the above object, the vehicle interior illumination device according to the present invention includes a first illumination unit, a second illumination unit, a third illumination unit, a fourth illumination unit, and an illumination controller.

The first illumination unit illuminates a first region in the front and upper part of a passenger compartment or cabin. The second illumination unit illuminates a second region in a part of the vehicle more rearward than the first region and in the upper part of the passenger compartment. The third illumination unit illuminates a third region in a part of the vehicle lower than the first region and in the front part of the passenger compartment. The fourth illumination unit illuminates a fourth region more rearward than the first region and in the vehicle lower part.

While the vehicle is running, the illumination controller is configured to differentiate, i.e., cause to change at least either an illumination intensity or luminance of the first illumination unit relative to the fourth illumination unit, or an illumination intensity of the second illumination unit relative to the intensity of the third illumination unit.

In the vehicle interior or passenger compartment illumination controller according to the present invention, while the vehicle is running, the illumination controller differentiates the intensity of a first illumination unit that illuminates a first region in the front and upper part of the passenger compartment relative to the intensity of a fourth region in a vehicle position more rearward than the first region and downward of the vehicle. Alternatively, the illumination controller is configured to differentiate the intensity of a second illumination unit that illuminates a second region in a vehicle position more rearward than the first region and upward of the passenger compartment relative to the intensity of a third illumination unit that illuminates a third region vehicle downward than the first region and in the front part of the passenger compartment.

In other words, while the vehicle is running, the intensities of two illumination units which are intended to illuminate different regions from each other are controlled to differentiate relative illumination intensities with respect to a longitudinal direction or a vertical direction of the vehicle. Thus, compared to the case in which the intensity of the illumination units for illuminating the vehicle interior is changed uniformly, a sharp contrast or an accent on the illumination change may be produced. As a result, it is possible to illuminate the vehicle passenger compartment properly while preventing the driver from feeling annoyed or being distracted.

BRIEF DESCRIPTION OF DRAWINGS

Referring now to the attached drawings which form a part of this original disclosure.

FIG. 6 is a table showing the settings of the illumination intensity per illumination unit in the processing of the illumination control;

DETAILED DESCRIPTION OF EMBODIMENTS

Figure 1:
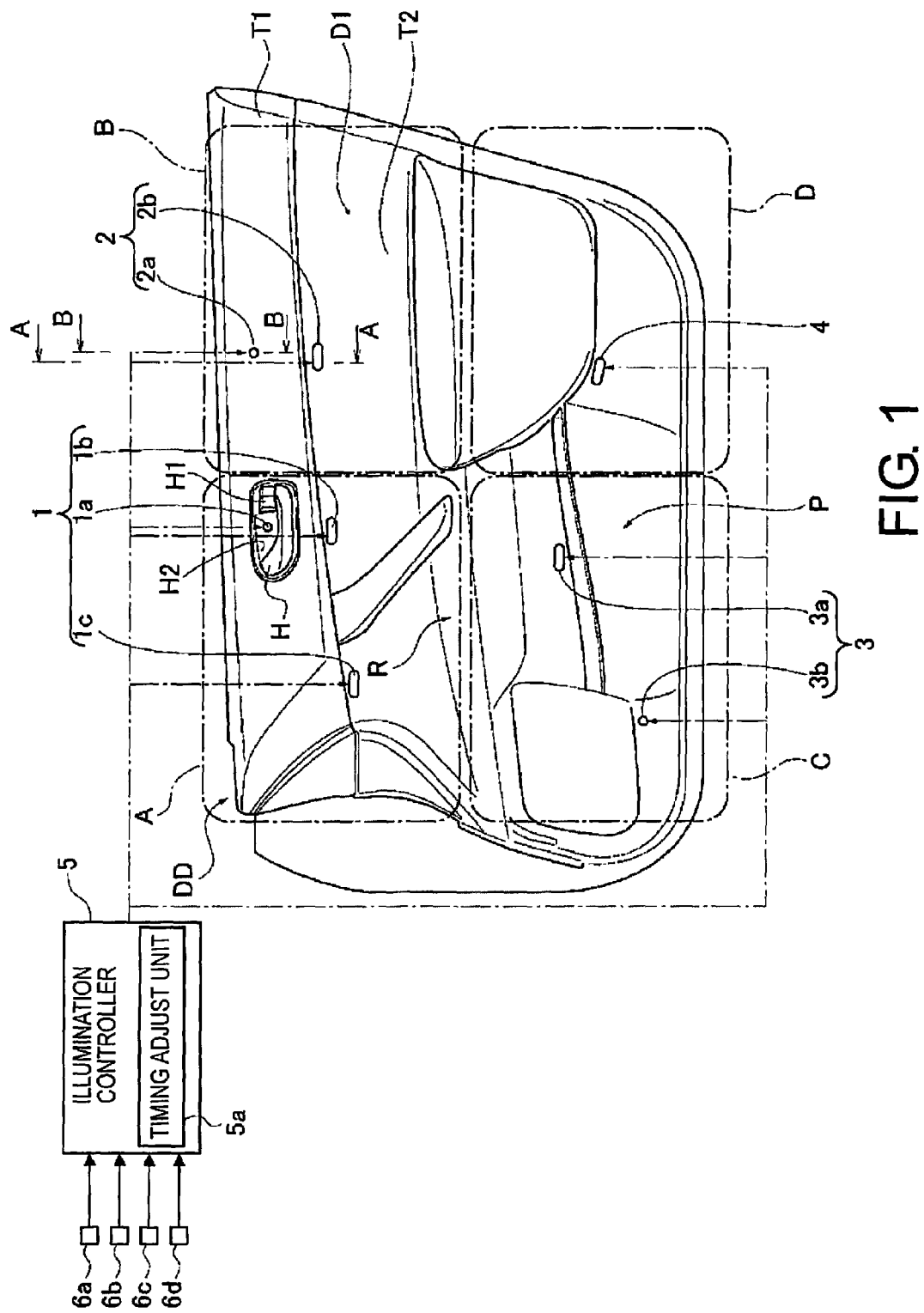
FIG. 1 is an overall configuration diagram showing a vehicle interior illumination device in a first embodiment.

Below, description is given of an embodiment for implementing a vehicle interior illumination device according to the present invention with reference to a first embodiment shown in the drawings.

First Embodiment

The configuration of the vehicle interior illumination device is described separately in "OVERALL CONFIGU- RATION OF ILLUMINATION DEVICE", "DETAILED CONFIGURATION OF ILLUMINATION UNIT", "DETAILED CONFIGURATION OF ILLUMINATED REGION", and "CONFIGURATION OF ILLUMINATION CONTROL PROCESS", respectively.

Overall Configuration of Illumination Device

FIG. 1 is an overall configuration diagram showing a vehicle interior illumination device in a first embodiment. Below, with reference to FIG. 1, description is give of the overall configuration of the illumination device in the first embodiment.

As shown in FIG. 1, the vehicle interior illumination device in the first embodiment includes a plurality of illumination units (first illumination unit 1, second illumination unit 2, third illumination unit 3, and fourth illumination unit 4) disposed on a door trim D1 of a driver's door DD. Here, the vehicle interior illumination device represents a so-called indirect lighting system and is intended to illuminate the door trim D1 of the driver's door DD and to brighten the cabin or passenger compartment by reflected light.

The first illumination unit 1 is composed of an opening portion formed in the door trim D1 and a lamp which is disposed inside the opening portion, and illuminates a first region A in front, upper part of the passenger compartment. Note that the "illumination" refers to rendering brighter by the reflection light from the door trim D1, and the same applies below as well. The first illumination unit 1 includes a handle illumination unit 1a, a first central illumination unit 1b, and a front illumination unit 1c. The handle illumination unit 1a is disposed inside a mounting recess H2 formed in an upper trim T1 along the window frame and upper part of a door trim D1. A door handle H and a door lock H1 are disposed in the mounting recess H2. The first central illumination unit 1b is disposed in a gap between the upper trim T1 and an intermediate trim T2 disposed between the upper trim T1 and an armrest and mounted below the door handle H. The front illumination unit 1c is disposed in a gap between the upper trim T1 and the intermediate trim T2, and is mounted near the front end portion of the driver's door DD.

The second illumination unit 2 is composed of an opening portion formed in the door trim D1, and a lamp which is disposed inside the opening portion, and is intended to illuminate a second region in the vehicle rearward position of the first region A and in the upper part of the passenger compartment. Further, the second illumination unit 2 includes an upper illumination unit 2a and a second central illumination unit 2b.

The upper illumination unit 2a is disposed at substantially the same height as the door handle H, and located in a rearward position of the door handle H. The second central illumination unit 2b is mounted in a gap between the upper trim T1 and the intermediate trim T2 and below the upper illumination unit 2a.

The third illumination part 3 is composed of an opening portion formed in the door trim D1 and a lamp which is disposed inside the opening portion, and is intended to illuminate a third region C positioned lower than the first region A and in the front part of the passenger compartment. Further, the third illumination unit 3 includes a pocket illumination unit 3a and a foot illumination unit 3b.

The pocket illumination unit 3a is disposed near the opening portion of the door pocket P, and positioned lower than the door handles H. The foot illumination unit 3b is disposed at the lower rear end portion of the driver's door DD.

The fourth illumination unit 4 includes an opening portion formed in the door trim D1 and a lamp disposed inside the opening portion, and positioned near the rear end portion of the driver's door of a door pocket P disposed on the driver's door DD. The fourth illumination unit 4 illuminates a fourth region which is in a vehicle position more rearward of the first region A and in the vehicle lower part, i.e., in a part lower than the second region B and behind the third region C.

The illumination controller 5 is configured to include a computing process unit such as a CPU (Central Processing Unit or processor) or the like and a memory element (or storage device), such as ROM (Read Only Memory) or a RAM (Random Access Memory) for executing an illumination control process described below to thereby perform a lighting/illumination control on each of the first to fourth illumination units 1 to 4. Further, the illumination controller 5 includes a timing adjusting unit 5a. The timing adjusting unit 5a is an arithmetic circuit for adjusting the execution timing of the illumination control of the first to fourth illumination unit 1 to 4.

Further, the illumination controller 5 receives inputs of the ON/OFF state of the lighting switch 6a, the seating state of the driver's seat sensed by a seating sensor 6b, the ON/OFF state of the ignition key switch 6c, and a vehicle speed detected by a vehicle speed sensor 6d, and performs the illumination control process based on the information described above.

Detailed Configuration of Illumination Unit

Figure 2:
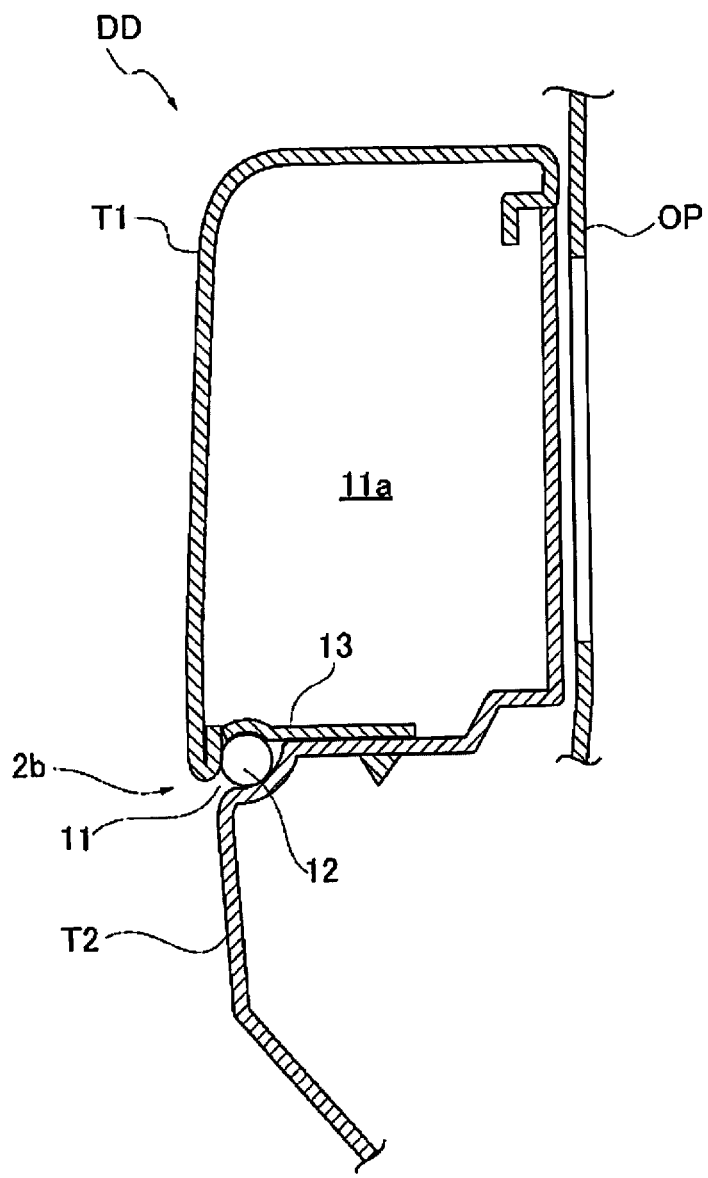
FIG. 2 is a cross-sectional view taken along A-A in FIG. 1.
Figure 3:
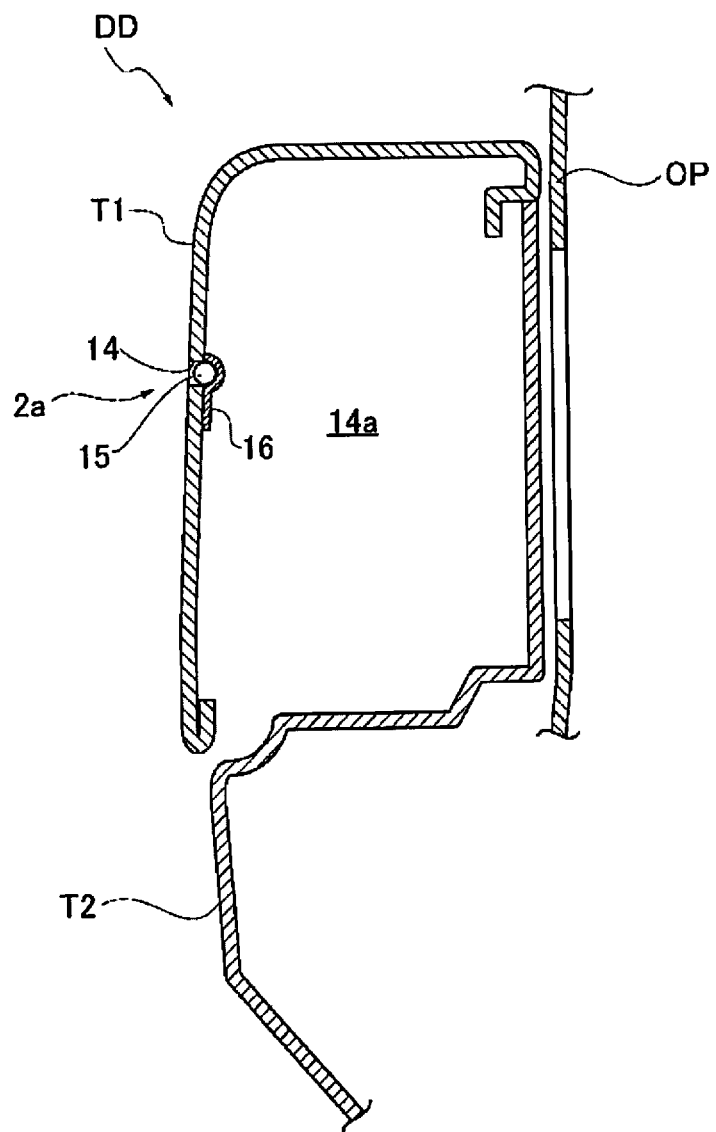
FIG. 3 is a cross-sectional view taken along B-B in FIG. 1.

FIG. 2 is a cross-sectional view taken along A-A in FIG. 1, and FIG. 3 is a cross-sectional view taken along B-B in FIG. 1. Below, with reference to FIGS. 2 and 3, description is given of the detailed configuration of the illumination unit in the first embodiment.

As shown in FIG. 2, the second central illumination unit 2b includes an opening portion 11 which is formed between the upper trim T1 and the intermediate trim T2 adjacent to each other and a lamp 12 disposed in an interior space 11a inside the opening portion 11 so as to face the opening portion 11, which is defined by the upper trim T1, the intermediate trim T2, and an outer panel OP.

A fixing clamp member 13 is fixed at one end to the intermediate trim T2 and the lamp 12 is clamped by the other end thereof so as to face the opening portion 11. The light from the lamp 12 illuminates the surface of the trim of the driver's door DD through opening portion 11. Note that the configurations of the front illumination unit 1c, and the first central illumination unit 1b are almost equivalent to the second central illumination unit 2b. Thus, the specific explanations thereof is are omitted here.

Now, a description is provided of a configuration of the upper illumination unit 2a.

As shown in FIG. 3, the upper illumination unit 2a includes an opening portion 14 of circular shape, and a lamp 15 is disposed inside the opening portion 14 so as to face the opening portion 14, i.e., in an inner space 14a covered by the upper trim T1.

The lamp 15 is held by the upper trim T1 via a fixing clamp member 16 so as to face the opening portion 14. Also, the light from the lamp 15 illuminates the surface of the driver's door DD via the opening portion 14. Note that respective configuration of the handle illumination unit 1a, the pocket illumination unit 3a, the foot illumination unit 3b, and the fourth illumination unit 4 is substantially the same as the upper illumination unit 2a. Thus, the specific explanation thereof is omitted here.

Detailed Configuration of Illuminated Region

Figure 4:
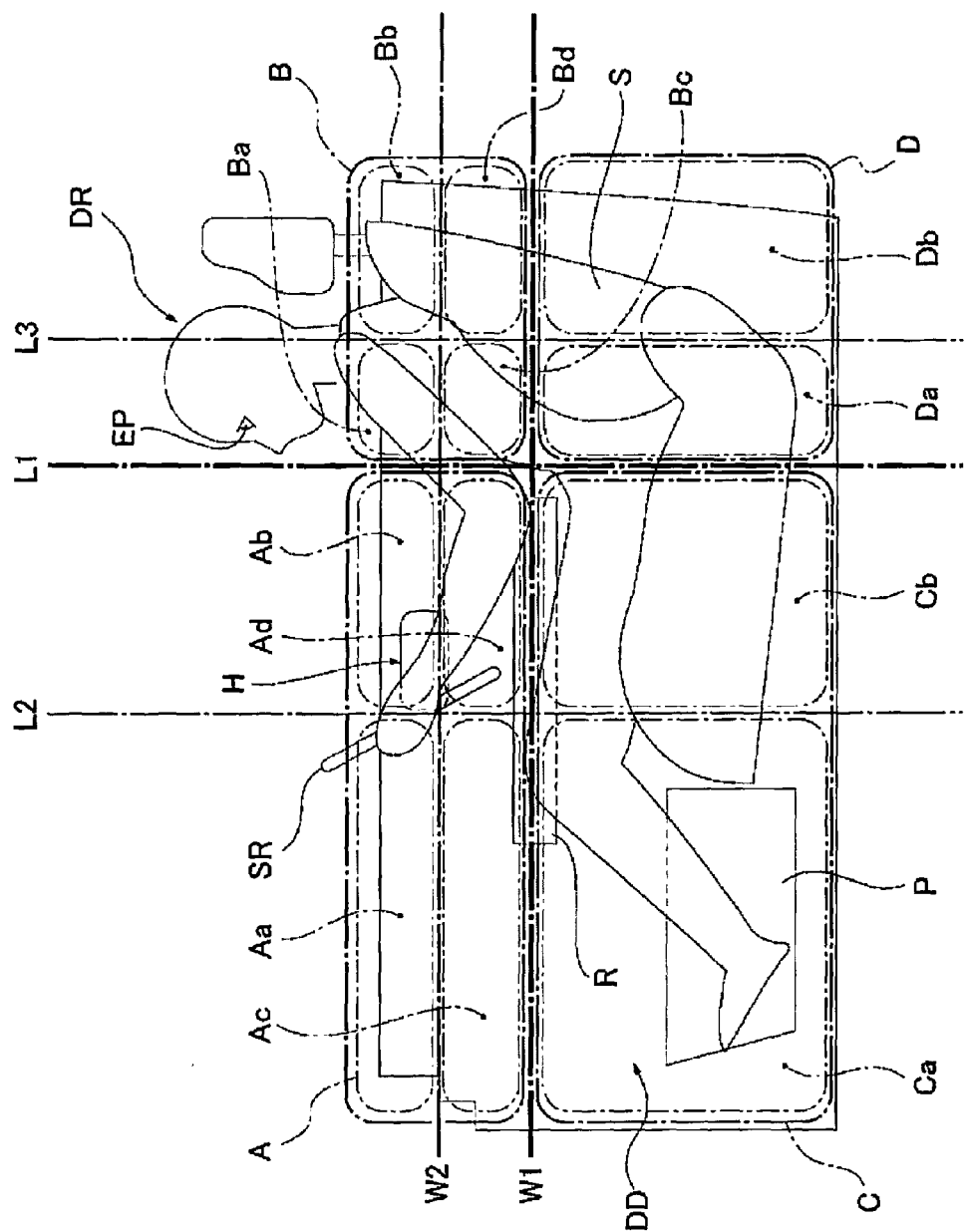
FIG. 4 is an explanatory diagram schematically illustrating an illumination region in the vehicle interior illumination device of the first embodiment.

FIG. 4 is an explanatory diagram schematically illustrating an illumination region in the vehicle interior illumination device of the first embodiment. Below, with reference to FIG. 4, a description is given of the detailed configuration of the illuminated region area in the illumination device of the first embodiment.

As shown in FIG. 4, the first region A refers to a region of a front side of a position L1 immediately before the eye point EP of the driver DR being seated in the driver's seat S (hereinafter referred to as "EP front"), and a region above the height of the armrest R (referred to as "armrest position" hereinafter) disposed on the driver's door DD.

Here, the "eye point EP" refers to the position of the eyes of the driver DR, and the "EP front" is a boundary position of the visible region in a state in which the driver DR is watching the front. The region rearward of the EP front L1 may not visible in a state in which the driver DR is watching at the front.

As shown in FIG. 4, the first region A is divided in the vehicle longitudinal direction by a set position L2 of a steering SR (hereinafter, referred to as "steering position"), and further divided in the vertical direction of the vehicle by a height position W2 at which the door handle H is disposed (hereinafter, referred to as "door handle position"). Here, within the first region, a region forward of the steering position L2 and upward of the door handle position W2 is referred to as a 1-1 region Aa. Also, a region between the steering position L2 and the EP front L1 and upward of the door handle position W2 of the vehicle is referred to as a 1-2 region Ab. Further, a region located in a vehicle forward position of the steering position L2 and between the door handle position W2 and the armrest position W1 is referred to as a 1-3 region Ac. Finally, a region between the steering position L2 and the EP front L1 and between the door handle position W2 and the armrest position W1 is referred to as a 1-4 region Ad.

The 1-1 region Aa corresponds to a region in which an instrument panel or the like (not shown) is disposed, and is therefore not illuminated. The 1-2 region Ab is illuminated by the handle illumination unit 1a of the first illumination unit 1. The 1-3 region Ac is illuminated by the front illumination unit 1c of the first illumination unit 1. The 1-4 region Ad is illuminated by the first central illumination unit 1b.

As shown in FIG. 4, the second region B is located rearward of the EP front L1 and upward of the armrest position W1. In addition, the second region B is divided in the vehicle longitudinal direction by a trunk position L3 of the driver seated in the driver's seat S, and further divided in the vertical direction by the door handle position W2.

Here, the "trunk position" means a position of the shoulder of the driver DR seated in the driver seat S, and is the boundary position of the visible area of the driver when the driver's eyes are moved with a fixed head position. The reason the area rearward of the trunk position L3 cannot be viewed is due to the driver DR head being fixed.

Further, out of the second region B, a region between the EP front L1 and the trunk position L3 and vehicle upward of the door handle position W2 is referred to as a 2-1 region Ba. Furthermore, a region rearward of the trunk position L3 and upward of the door handle position W2 is referred to as a 2-2 region Bb.

Moreover, a position between the EP front L1 and the trunk position L3 and between the door handle position W2 and the armrest position W1 is referred to as a 2-3 region Bc. Finally, a region rearward of the trunk position L3 and between the door handle position W2 and the armrest position W1 is referred to as a 204 region Bd.

The 2-1 region Ba is illuminated by the upper illumination unit 2a of the second illumination unit 2. The 2-2 region Bb is not illuminated because of being outside of the visible region of the driver DR. The 2-3 region Bc is illuminated by the second central illumination unit 2b of the second illumination unit 2. The 2-4 region Bd is not illuminated because of being outside of the visible filed of the driver DR.

As shown in FIG. 4, the third region C is a region located on the front side of the EP front L1, and below the armrest position W1. Further, the third region C is defined in the vehicle longitudinal direction by the steering position L2. In addition, of the third region C, the region ahead of the steering position L2 is referred to as a 3-1 region Ca. Also, a region rearward of the steering position L2 and front of the EP front L1 is referred to as a 3-2 region Cb.

The 3-1 region Ca is illuminated by the foot illumination unit 3b of the third illumination unit. The 3-2 region Cb is illuminated by the pocket illumination unit 3a of the third illumination unit 3.

The fourth region D represents a region rearward of the EP front L1 and below the armrest position W1. Also, the fourth region D is divided in the vehicle longitudinal direction by the trunk position L3. Of the fourth region D, a region rearward of the EP front L1 and forward of the trunk position L3 is referred to as a 4-1 region Da. Also, a region rearward of the trunk position L3 is referred to as a 4-2 region Db.

The 4-1 region Da is illuminated by the fourth illumination unit 4. The 4-2 region Db is not illuminated because of not being in the visible field of the driver DR.

Configuration of Illumination Control Process

Figure 5:
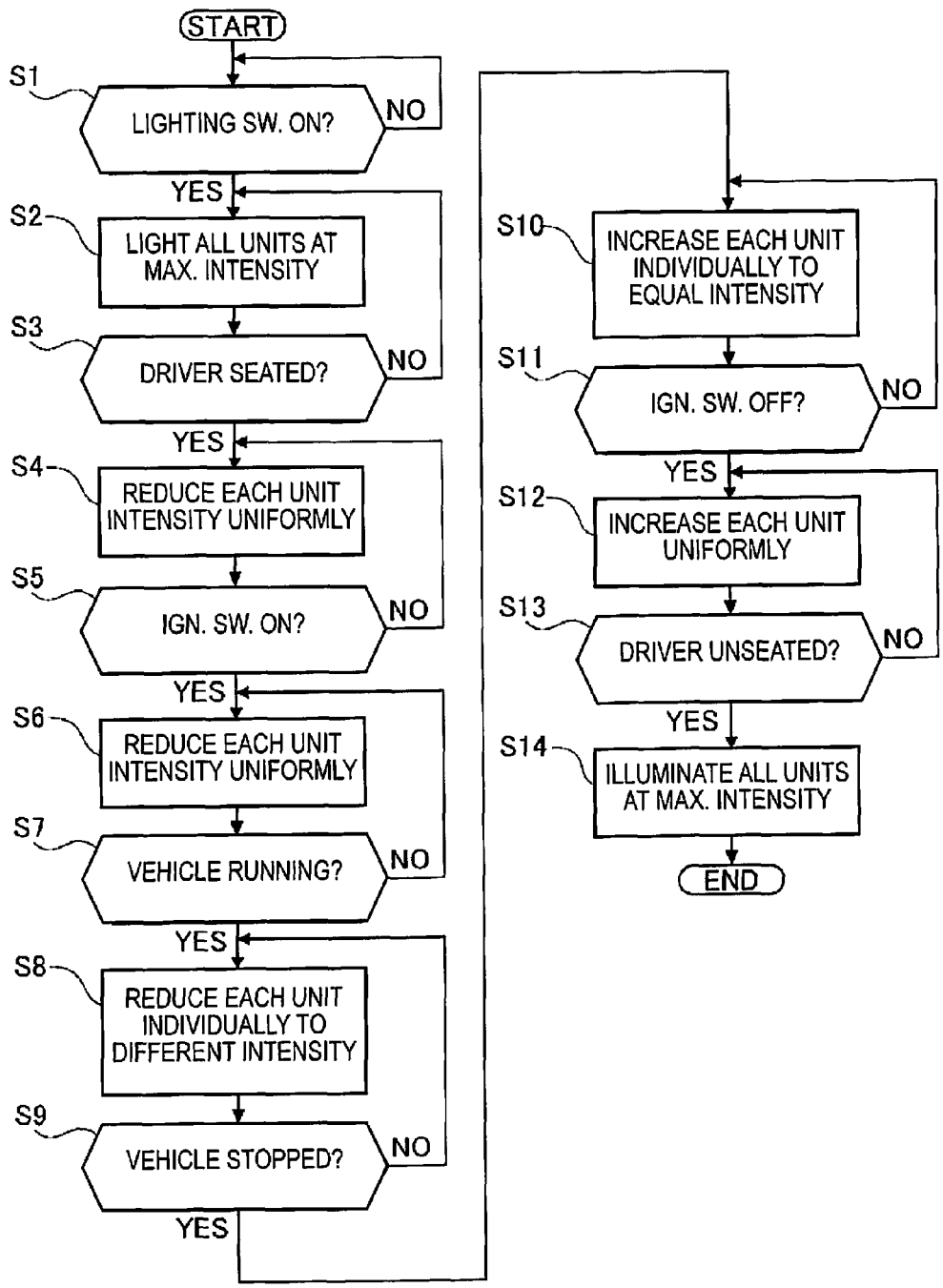
FIG. 5 is a flowchart showing a flow of processing in the illumination control of the vehicle interior illumination device of the first embodiment.

FIG. 5 is a flowchart showing a flow of an illumination control process for the vehicle interior illumination device in the first embodiment. Hereinafter, with reference to FIG. 5, description is given of a configuration of the illumination control process of the first embodiment. Note that the illumination control process shown in FIG. 5 is executed by the illumination controller 5.

In step S1, it is determined whether or not the lighting switch 6a is turned ON. Control YES proceeds to step S2 in the case of YES (ON operation). If NO, step S1 is repeated.

The lighting switch 6a is disposed in the vehicle passenger compartment or on a portable intelligent key, respectively, and is operable from outside of the vehicle. Note that the determination on operation of the lighting switch 6a is made based on an operational signal from the lighting switch 6a.

In step S2, following the determination in step S1 that the lighting switch 6a has been turned on, all of the first to fourth illumination units are illuminated or energized at maximum intensity of illumination, and control proceeds to step S3. In this situation, the "maximum illumination", is set to 4 $lm/m^2$. The maximum luminance of the first to fourth illumination units is the same across the board.

In step S3, following the lighting of the illumination units in step S3, it is determined whether or not the driver DR is seated. If Yes (seated), it is determined that the driver has situated in the vehicle (operational preparation completed), and control proceeds to step S4. If No (unseated), it is determined that the driver DR has not entered the vehicle and is not ready for operation, and control returns to step S2. Note that the seating determination on the driver's seat S is performed based on a detection signal from the seat sensor 6b.

In step S4, following the determination of the driver being seated in the step S3, all of the first to fourth illumination units 1 to 4 are uniformly reduced in intensity, and control proceeds to step S5. Here, the reduced intensity is set to a first illumination in advance. At this time, the timing change of respective illumination units 1 to 4 will be adjusted by the timing adjusting unit 5a, and all illumination units change illumination in a synchronized manner. Here, the term "synchronized" indicates that both the start and completion of the illumination change as well as the change speed or rate are the same in all illumination units. Below, when changing (the intensity of) illumination in the vehicle interior illumination device of the first embodiment, each of the illumination units 1 to 4 synchronously changes. Also, the "first illumination" is set to 2 $lm/m^2$.

In step S5, following the uniform reduction in the illumination in step S4, it is determined whether or not the ignition switch 6c has been turned ON. If YES, the engine start is confirmed and control proceeds to step S6. If NO (OFF operation), the engine is determined not started, and control returns step S4. Note that the determination of the operation of the ignition key switch 6c is performed based on the operation signal from the ignition key switch 6c.

In step S6, following the determination of the ignition key switch 6c being ON in step S5, the intensity of illumination of all illumination units 1 to 4 is reduced uniformly, and control proceeds to step S7. Here, the illumination is set to a second intensity less than the first intensity, which has been set in advance. The "second intensity" is set to 1 $lm/m^2$, which corresponds to a quarter of the maximum illumination intensity so as not to affect the view.

In step S7, following the illumination uniform reduction in step S6, it is determined whether or not the vehicle is running. If YES (i.e. running), control proceeds to step S8. In the case of NO (vehicle being stopped), control returns to step S6. The running determination is performed based on the detection signal from the vehicle speed sensor 6d, and it is determined that the vehicle is running when exceeding a preset speed.

In step S8, following the determination that the vehicle is running in step S7, each of the first to fourth illumination units 1 to 4 is individually reduced in intensity, and control proceeds to step S9. Here, the intensity is preset for each illumination unit. Here, the illumination is set as shown in a Table shown in FIG. 6.

Note that the magnitude of each illumination is set such that the following relationship is met: third illumination>fourth illumination>fifth illumination>sixth illumination. With greater (higher) illumination or intensity, the illumination becomes brighter. More specifically, the reduction rate in intensity is the lowest in the pocket illumination unit 3a that illuminates the 3-2 region Cb and in the for the illumination unit 4 that illuminates the 4-1 region Da so that these regions will be the brightest regions. On the other hand, the reduction rate in illumination of the upper side illumination unit 2a that illuminates the 2-1 region Ba is the highest so that the reason will be relatively most dark. Here, it is assumed that the "third illumination" is set to 1 $lm/m^2$ as the second illumination, the "fourth luminance" to 0.5 $lm/m^2$, the "fifth illumination" to 0.1 $lm/m^2$, and the "sixth illumination" to 0.051 $m/m^2$, respectively.

In step S9, following the individual control of illumination in step S8, it is determined whether or not the vehicle has stopped. In the case of YES (stopped), control proceeds to step S10. In the case of NO (running), control returns to step S8. The stopping determination is made based on the detection signal from the vehicle speed sensor 6d, and a stopped states is determined when the vehicle speed falls below a prescribed speed.

In step S10, following the stopping determination at step S9, the illumination of each of the first to fourth illumination units 1 to 4 is individually increased to set the illumination of all illumination units equal to each other, and control proceeds to step S11. Here, the illumination is set to a preset, second illumination.

In step S11, following the illumination increase in step S10, it is determined whether or not the ignition key 6c has been turned OFF. If YES (OFF operation), it is determined that the engine has been stopped (ready to leave the vehicle), and control proceeds to step S12. If NO (ON operation), it is determined that the engine is not stopped (not ready to leave the vehicle), and control returns to step S10.

Note that the operation determination of the ignition key switch 6c is performed based on an operation signal from the ignition key switch 6c.

In step S12, following the determination of the ignition key switch 6c being operated to OFF in step S11, the illumination of all the first to fourth illumination units 1 to 4 is increased uniformly, and control proceeds to step S13. Here, the illumination is set to a preset, first illumination.

In step S13; following the uniform increase of illumination in the step S12, it is determined whether or not the driver DR is unseated in the driver's seat S. If YES (unseated), it is determined that the driver DR has left the vehicle, and the process proceeds to step S14. In the case of NO (seated), it is determined that the driver has not left the vehicle, and the process returns to step S12. The seating determination of the driver's seat S is performed based on a detection signal from the seat sensor 6b.

In step S14, following the determination of an unseated state in step S13, the illumination of all the first to fourth illumination units 1 to 4 is increased evenly to be set to the maximum intensity. Thereafter, control ends.

Now, description is given of the operation. First, description is given of the "illumination hassle or illumination annoyance sensed by the driver and the associated problem", followed by the illuminating operation of the vehicle interior illumination device in the first embodiment.

Illumination Nuisance Sensed by Driver and Associated Problem

Figure 7:
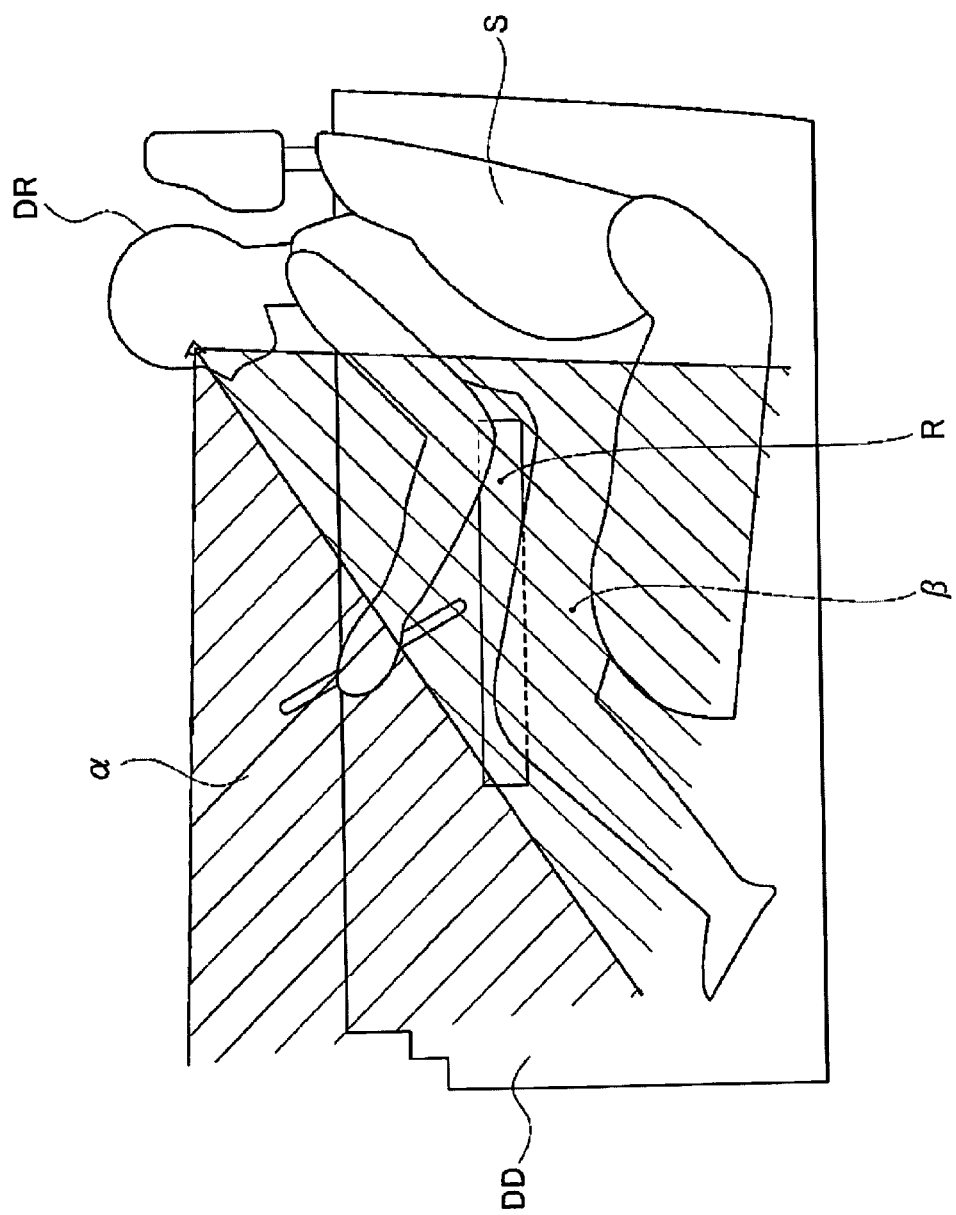
FIG. 7 is an explanatory view showing the view of the driver when seated.

FIG. 7 is an explanatory view showing the view of the driver who is seated. Below, a description is made of the illumination annoyance the driver feels with reference to FIG. 7.

When the driver DR who is seated in the driver's seat S and gazes at the front of the vehicle, a first viewing field "a" shown in FIG. 7 (i.e., 0° to 40° of downward angle here) is a range that is visible by moving eyes only while the head is fixed. Further, a second viewing field β (i.e., 40° to 90° of downward angle) is a range visible when moving the head while the body or torso is fixed. In other words, the first viewing field α represents a region relatively easy to be seen from the driver DR, while the second field β is the region that is relatively difficult to be seen from the driver DR.

In addition, the object which protrudes most into the cabin or passenger compartment from the driver's seat door DD is the armrest R. Therefore, since visibility is deteriorated by the armrest R, the region below the armrest R represents the region which is relatively difficult to be viewed from the driver DR who is seated in the driver's seat S. On the other hand, the region above the armrest R is close to the driver's head. In addition, there is nothing to block the view. Thus, this upper region is a region that is relatively easily visible from the driver seated in the driver seat S.

On the other hand, the region which is relatively easy to be seen from the driver DR has been found to have a high illumination sensitivity. More specifically, the region with high illumination sensitivity may be dazzling and cause strong annoyances and provide less positive feeling, such as reassurance or freshness.

Stated another way, the first viewing field or field of view a with relatively high illumination sensitivity represents a region easily bothered by illumination, while the second viewing field β with relatively low illumination sensitivity is a region less likely to be bothered by illumination. Further, the region above the armrest R is the region with relatively high illumination sensitivity representing an easily bothered region, whereas the region below the armrest R has relatively low illumination sensitivity, and thus is unlikely to cause annoyance due to light. Thus, since, with respect to the driver DR which is seated in the driver's seat S, the illumination sensitivity is different for each region of the cabin or passenger compartment, there is a problem that the annoyance of the illumination is also different for each region of the cabin or passenger compartment.

Furthermore, the appearance sensed by the driver DR is different in the vehicle longitudinal direction depending on a downward angle (viewing angle). In addition, since the view is blocked by the armrest R, the appearance further varies depending on the vertical direction of the vehicle. That is, for example, even with different illumination intensity in the vertical direction of the vehicle, the appearance is different in the longitudinal direction of the vehicle depending on the downward angle (viewing angle), it is difficult to reduce the nuisance sufficiently. Further, even with different illumination intensity in the longitudinal direction of the vehicle, the appearance is different depending on the vehicle vertical direction with respect to the armrest R, it is difficult to reduce the troublesome feeling.

As discussed above, it can be seen that, in order to reduce the burden of the illumination sensed by the driver DR, it is necessary to put an accent on illuminance in each of the longitudinal direction and the vertical direction of the vehicle.

In order to reduce the annoyance to the driver DR, a case is assumed in which the intensity of the illumination is uniformly reduced so as to be dark. In this case, although the annoyance is decreased, the region that is unlikely to cause annoyance also becomes dark, so that it is dark in the entire vehicle interior. Therefore, it is impossible to obtain sufficient illumination effects.

Lighting Control Operation

Figure 8:
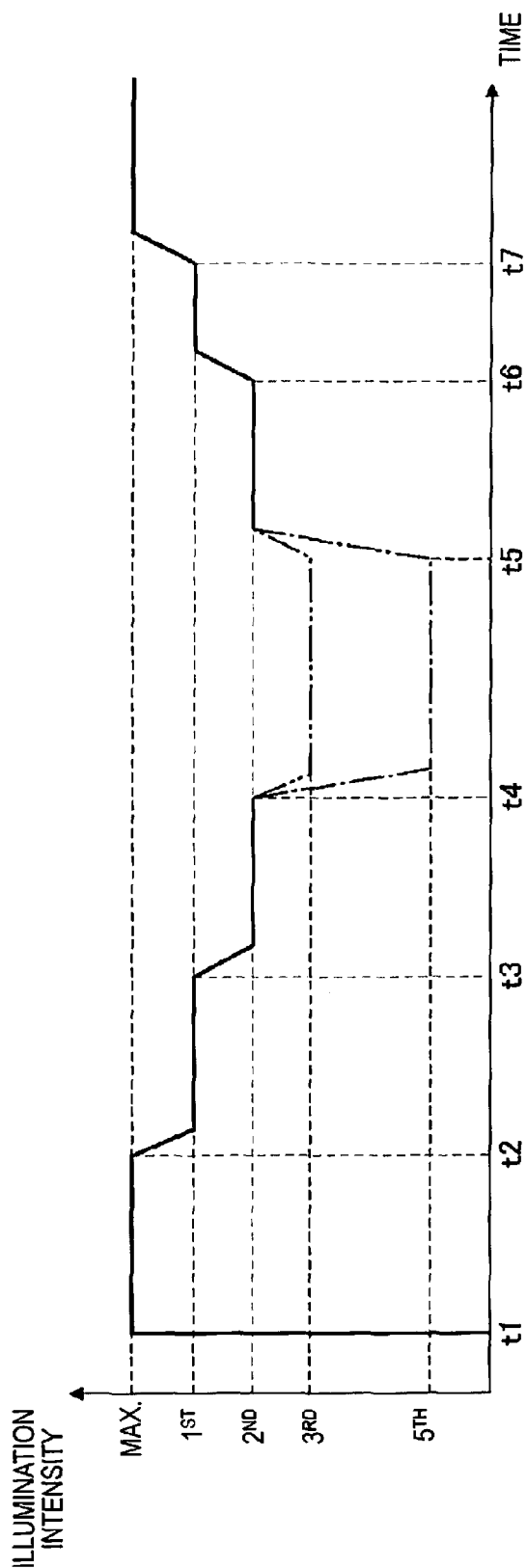
FIG. 8 is a time chart showing an intensity characteristic of the first illumination unit and an intensity characteristic of the fourth illuminating unit with respect to a vehicle state in the vehicle interior illumination device of the first embodiment.

In the vehicle interior illumination device of the first embodiment, FIG. 8 is a time chart showing the luminance or intensity characteristics of a handle illumination unit and that of the fourth illumination unit. Note that, in FIG. 8, a chain line shows the intensity characteristics of the handle illumination unit, and a two-dot chain line shows the intensity or luminance characteristics of the fourth illumination unit. Below, with reference to FIG. 8, description is given of the lighting control operation of the vehicle interior illumination device in the first embodiment.

As shown in FIG. 8, at time t1, upon a lighting switch 6a being turned ON, control proceeds to step S2 through S1 in the flowchart shown in FIG. 5, in which all the first to fourth illumination units 1 to 4 are lit. At this time, the intensity of each illumination unit 1 to 4 is set at the maximum. Since the maximum intensity is uniform across all illumination units 1 to 4, the intensity of the handle illumination unit 1a and the intensity of the fourth illumination unit 4 are equal.

At time t2, when the driver DR is seated on the driver seat S, control proceeds to step S4 from S3, where all the first to fourth illumination units 1 to 4 are reduced in intensity uniformly and set to a first intensity. In other words, the intensity of the handle illumination unit 1a and the intensity of the fourth illumination unit 4 are set to the first intensity, respectively.

At time t3, when the ignition key switch 6c is turned ON, control proceeds to S6 from S5, where all the first to fourth illumination units 4 are further reduced in intensity to be set to a second intensity. Thus, the intensity of the handle illumination unit 1a and the intensity of the fourth illumination unit 4 are jointly set to the second intensity.

At time t4, a determination is made that the vehicle is running when the vehicle speed reaches a predetermined speed, and control proceeds from step S7 to S8, where the first to fourth illumination units 1 to 4 are reduced individually. The setting of illuminance or intensity of illumination for the first to fourth illumination units is made as shown in FIG. 6. More specifically, the handle illumination unit 1a is set to a fifth intensity, and the fourth illumination unit 4 is set to a third intensity. The fourth illumination unit 4 and the pocket illumination unit 3a of the third illumination unit 3 represent the illumination unit with the highest illumination intensity (brightness). In addition, the illumination unit with the lowest illuminance (i.e. darkest) is the upper illumination unit 2a of the second illumination unit 2.

Further, the handle illumination unit 1a is intended to illuminate the 1-2 region Ab shown in FIG. 4. In addition, the 1-2 region Ab represents such a region located between the steering position L2 and the EP front L1 and upper part above the door handle position W2, which comes into the viewing field of the driver DR relatively easily. On the other hand, the fourth illumination unit 4 is intended to illuminate the 4-1 region Da. In addition, the 4-1 region Da is a region below the armrest position W1 and at the rear side of the EP front L1 and in front of the vehicle than the trunk position L3. Therefore, this region is relatively hard to enter the field of view of the driver DR. That is, while driving, the illuminance or illumination intensity of an illumination unit (handle illumination unit 1a) that is intended to illuminate a region that can easily enter the field of view of the driver DR, i.e. a region in the front of and upward in the vehicle with respect to the driver DR, is set relatively low. Moreover, the illuminance of an illumination unit (fourth illumination unit 4) for illuminating a region which is difficult to enter the driver's field of vision, i.e. a region downward and rearward in the vehicle, is set relatively high.

At time t5, if it is determined that the vehicle has stopped when the vehicle speed reaches a vehicle speed less than the predetermined speed, control proceeds to step S10 from step S9, and each of the first to fourth illumination units 1 to 4 are allowed to increase individually. The setting of the first to fourth illumination units 1 to 4 is set to a predetermined, constant intensity (here, the second intensity). Thus, both the handle illumination unit 1a and the fourth illumination unit 4 are set to the second illumination intensity.

At time t6, upon the ignition key switch 6c being operated to the OFF position, control proceeds to S12 from S11, all the first to fourth illumination units 1 to 4 will be further increased in intensity uniformly and set to the first intensity. Thus, the illuminance of both handle illumination unit 1a and fourth illumination unit 4 are set to the first illumination intensity together.

At time t7, when the driver DR is away from the driver's seat S (i.e., an unseated state), control proceeds to step S14 from S13, and all the first to fourth illumination units 1 to 4 are uniformly increased so as to be set to a maximum intensity. In other words, the handle illumination unit 1*a* and the fourth illumination unit 4 are respectively set to the maximum intensity with the same level of brightness.

As described above, in the vehicle interior illumination device in the first embodiment, during running of the vehicle, the illumination intensity of the handle illumination unit 1*a* for illuminating the 1-2 region Ab of the first region A is set so as to be relatively different from the illumination intensity of the fourth illumination unit 4 intended to illuminate the 4-1 region Da of the fourth region D. Therefore, although the degree of annoyance of illumination felt by the driver DR are different depending on the vehicle interior region, by giving a difference in the intensity in the vehicle longitudinal direction as well as in the vertical direction of the vehicle, the annoyance may be reduced, and the necessary brightness may be secured. Thus, the driver DR is prevented from being annoyed or distracted, and the vehicle passenger compartment or interior may be illuminated appropriately.

In particular, in the first embodiment, the illumination intensity of the fourth illumination unit 4 is set to a relatively high third illumination intensity, while the illumination intensity of the handle illumination unit 1*a* is set to a relatively low, fifth illumination intensity. In other words, the intensity of the handle illumination unit 1*a* of the first illumination unit 1 is set higher than the intensity of the fourth illumination unit 4.

Thus, the region easily visible from the driver DR and with a high illumination sensitivity is darkened with a decreased intensity, while the region that is difficult to be seen from the driver DR with low illumination sensitivity is set to be bright with a high illumination intensity. Thus, it is possible to appropriately control the illumination to match the degree of illumination annoyance so as to prevent further annoyance.

Further, in the first embodiment, when the vehicle is running, the intensity of the pocket illumination unit 3*a* of the third illumination unit 3 is set to a relatively high third intensity, while the intensity of the upper illumination unit 2*a* of the second illumination unit 2 is set to a relatively low, fifth intensity. In other words, compared to the intensity of the third illumination unit 3, the intensity of the second illumination unit 2 is set lower.

Thus, it is possible to set the intensity of the region that is easily visible from the driver DR low, while the intensity of the region that is difficult to be seen from the driver DR is set high. Consequently, it is possible to adjust the intensity appropriately in accordance with the degree with which the driver is distracted by the light or illumination to further reduce the annoyance to the driver.

In the first embodiment, the region is divided into the first to fourth regions A to D in accordance with the viewing field of the driver DR who is seated within the passenger compartment and viewing in a forward direction, as well as in accordance with a position relative to the armrest R disposed within the vehicle passenger compartment. More specifically, a group of the first region A and the third region C is separated from a group of the second region B and a fourth region D by the EP front L1. Further, a group of the first region A and the second region B is separated from a group of the third region C and a fourth region D by the armrest position W1.

Here, the EP front L1 sets a reference position at which an object is captured within or out of the viewing field of the driver DR. In addition, the armrest position W1 sets a reference position that serves as a reference at which the viewing field of the driver DR is either blocked or not.

Therefore, it is possible to divide the region of illumination in an appropriate position in view of the visibility from the driver DR to thereby perform the illumination control appropriately.

Moreover, in the first embodiment, by the timing adjusting unit 5*a*, the change in illuminance or illumination intensity for all the first to fourth illumination units 1 to 4 are executed in synchronization. Therefore, it is possible to suppress an extreme change in illuminance in the passenger compartment to thereby further prevent the driver DR from feeling annoyance or being disturbed.

Now, description is given of effects.

In the vehicle interior illumination unit in the first embodiment, it is possible to obtain the following effects.

(1) A vehicle interior illumination device, comprising:

a first illumination unit 1 that illuminates a first region A in the front and upper part of the passenger compartment or cabin;

a second illumination unit 2 that illuminates a second region B in a vehicle part more rearward than the first region A and in the upper part of the passenger compartment;

a third illumination unit 3 that illuminates a third region C in the vehicle lower part than the first region A and in the front part of the passenger compartment;

a fourth illumination unit 4 that illuminates a fourth region D in the vehicle part more rearward than the first region A and in the vehicle lower part; and an illumination controller 5 that is configured to differentiate, while the vehicle is running, an illumination intensity of the first illumination unit 1 relative to that of the fourth illumination unit and/or an illumination intensity of the second illumination unit 2 relative to that of the third illumination intensity unit 3.

Thus, it is possible to illuminate the passenger compartment properly while preventing the driver DR from being annoyed.

(2) The illumination controller 5 is configured to include a (2) timing adjusting unit 5*a* for adjusting the control timing of each illumination unit 1 to 4 (first to fourth illumination units) in order to perform the intensity change of each of the illumination units 1 to 4 in synchronization.

Thus, it is possible to suppress an extreme change in intensity in the passenger compartment to thereby further prevent the driver DR from feeling annoyed.

(3) The illumination controller 5 is configured, while the vehicle is running, to set the illumination intensity of the first illumination unit 1 lower than that of the fourth illumination unit 4.

Thus, it is possible to appropriately control the illumination intensity to thereby make it more difficult to annoy the driver with illumination.

(4) The illumination controller 5 is configured, while the vehicle is running, to set the illumination intensity of the second illumination unit 2 lower than the third illumination unit 3.

Thus, it is possible to appropriately control the illumination intensity to thereby make it more difficult to annoy the driver with illumination.

(5) The division or separation of the first illumination unit 1 and the third illumination unit 3 are separated from the second illumination unit 2 and the fourth illumination 4 in accordance with a viewing field of the driver DR who is seated in the passenger compartment and is viewing in a forward direction.

Thus, in view of the degree of visibility from the drive DR, the regions to be illuminated are divided in an appropriate position so that it is possible to appropriately perform the illumination control to prevent annoyance.

(6) The division or separation of the first illumination unit 1 and the second illumination unit 2 are separated from the third illumination unit 3 and the fourth illumination 4 in accordance with a viewing field of the driver DR who is seated in the passenger compartment and is viewing in a forward direction.

Thus, in view of the degree of visibility from the drive DR, the regions to be illuminated are divided in an appropriate position so that it is possible to appropriately perform the illumination control to prevent annoyance.

Although a description has been made of the vehicle interior illumination device according to the present invention based on the first embodiment, the specific configurations are not limited thereto. Without departing from the gist of each invention pertaining to the claims, change in design or additions are acceptable.

In the first embodiment, the first to fourth illumination units 1 to 4 are intended to illuminate the door trim D1 by an indirect illumination device. However, the arrangement is not limited thereto. For example, the present invention is applicable to a direct illumination device for illuminating or lighting the hands or feet the driver DR. The present invention may be implemented in a combination of direct illumination and indirect illumination. In any case, by using different relative illumination intensity to different regions in each of the vertical direction and the longitudinal direction of the passenger compartment, it is possible to ensure an appropriate illumination during running and to prevent the driver DR from feeling annoyed.

Further, in the first embodiment, the vehicle interior or passenger compartment is divided by the EP front L1 and the armrest position W1, and further divided in the vehicle longitudinal direction by the steering position L2 and the trunk position L3. The vehicle interior is further divided in the vehicle vertical direction by the door handle position W2. However, the configuration is not limited thereto, but may be divided in the vehicle longitudinal direction and in the vehicle vertical direction at an arbitrary position.

Also, in the first embodiment, for example, to each of the divided regions such as the 1-2 region Ab, the 1-3 region Ac, the 1-4 region Ad, etc., a single illumination unit, such as the handle illumination unit 1a, the first central illumination unit 1b, the front illumination unit 1c, etc. is correspondingly allocated. However, the present invention is not limited thereto. A plurality of illumination units may be provided to one divided region. Alternatively, a plurality of regions may be illuminated by a single illumination unit. Further, the illumination unit may be changed to match the body size of the driver DR.

The invention claimed is:

1. A vehicle interior illumination device, comprising:
   a first illumination unit configured to illuminate a first region in a front part and an upper part of a passenger compartment of a vehicle;
   a second illumination unit configured to illuminate a second region in a rear part of the vehicle more rearward than the first region and being disposed in the upper part of the passenger compartment;
   a third illumination unit configured to illuminate a third region in a low part of the vehicle lower than the first region and being disposed in the front part of the passenger compartment;
   a fourth illumination unit configured to illuminate a fourth region in the rear part and in the low part; and
   an illumination controller programmed to differentiate, while the vehicle is running, at least one of an illumination intensity of the first illumination unit relative to an illumination intensity of the fourth illumination unit and an illumination intensity of the second illumination unit relative to an illumination intensity of the third illumination intensity unit.

2. The vehicle interior illumination device as claimed in claim 1, wherein
   the illumination controller includes a timing adjusting unit configured to adjust the control timing of each illumination unit to perform an intensity change of each of the first, second, third and fourth illumination units in synchronization.

3. The vehicle interior illumination device as claimed claim 2, wherein
   the illumination controller is programmed, while the vehicle is running, to set the illumination intensity of the first illumination unit lower than the illumination intensity of the fourth illumination unit.

4. The vehicle interior illumination device as claimed in claim 2, wherein
   the illumination controller is programmed, while the vehicle is running, to set the illumination intensity of the second illumination unit lower than the illumination intensity of the third illumination unit.

5. The vehicle interior illumination device as claimed in claim 2, wherein
   the first illumination unit and the third illumination unit are arranged so as to be separated from the second illumination unit and the fourth illumination in accordance with a viewing field of a driver seated in the passenger compartment and viewing in a forward direction.

6. The vehicle interior illumination device as claimed in claim 2, wherein
   the first illumination unit and the second illumination unit are arranged so as to be separated from the third illumination unit and the fourth illumination in accordance with a viewing field of a driver seated in the passenger compartment and viewing in a forward direction.

7. The vehicle interior illumination device as claimed claim 1, wherein
   the illumination controller is programmed, while the vehicle is running, to set the illumination intensity of the first illumination unit lower than the illumination intensity of the fourth illumination unit.

8. The vehicle interior illumination device as claimed in claim 7, wherein
   the illumination controller is programmed, while the vehicle is running, to set the illumination intensity of the second illumination unit lower than the illumination intensity of the third illumination unit.

9. The vehicle interior illumination device as claimed in claim 7, wherein
   the first illumination unit and the third illumination unit are arranged so as to be separated from the second illumination unit and the fourth illumination in accordance with a viewing field of a driver seated in the passenger compartment and viewing in a forward direction.

10. The vehicle interior illumination device as claimed in claim 7, wherein
the first illumination unit and the second illumination unit are arranged so as to be separated from the third illumination unit and the fourth illumination in accordance with a viewing field of a driver seated in the passenger compartment and viewing in a forward direction.

11. The vehicle interior illumination device as claimed in claim 1, wherein
the illumination controller is programmed, while the vehicle is running, to set the illumination intensity of the second illumination unit lower than the illumination intensity of the third illumination unit.

12. The vehicle interior illumination device as claimed in claim 11, wherein
the first illumination unit and the third illumination unit are arranged so as to be separated from the second illumination unit and the fourth illumination in accordance with a viewing field of a driver seated in the passenger compartment and viewing in a forward direction.

13. The vehicle interior illumination device as claimed in claim 11, wherein
the first illumination unit and the second illumination unit are arranged so as to be separated from the third illumination unit and the fourth illumination in accordance with a viewing field of a driver seated in the passenger compartment and viewing in a forward direction.

14. The vehicle interior illumination device as claimed in claim 1, wherein
the first illumination unit and the third illumination unit are arranged so as to be separated from the second illumination unit and the fourth illumination in accordance with a viewing field of a driver seated in the passenger compartment and viewing in a forward direction.

15. The vehicle interior illumination device as claimed in claim 14, wherein
the first illumination unit and the second illumination unit are arranged so as to be separated from the third illumination unit and the fourth illumination in accordance with a viewing field of a driver seated in the passenger compartment and viewing in a forward direction.

16. The vehicle interior illumination device as claimed in claim 1, wherein
the first illumination unit and the second illumination unit are arranged so as to be separated from the third illumination unit and the fourth illumination in accordance with a viewing field of a driver seated in the passenger compartment and viewing in a forward direction.

* * * * *